Feb. 7, 1961 R. J. RICHIE 2,970,840

GEOLOGY GAME

Filed March 19, 1956 4 Sheets-Sheet 2

Feb. 7, 1961 R. J. RICHIE 2,970,840

GEOLOGY GAME

Filed March 19, 1956 4 Sheets-Sheet 4

United States Patent Office 2,970,840
Patented Feb. 7, 1961

---

2,970,840

GEOLOGY GAME

Raymond Joseph Richie, 1539 6th St., Alameda, Calif.

Filed Mar. 19, 1956, Ser. No. 572,407

2 Claims. (Cl. 273—134)

My invention relates to a board game apparatus intended primarily for the playing of a game with a geological basis, specifically, the recovery of mineral wealth from the ground. Since the science of geology involves three dimensions this invention allows for a third dimension of depth or angular depth besides the usual two dimensions of length and width of a flat board.

This is essentially a game involving the acquisition of leases, their subsequent sale or development and, which will be gone into in more detail later, attempting to connect them in the most advantageous way so as to derive the most benefit possible from the oil or minerals that underlie the leases the players have acquired.

Also, it is possible to "build up" or join oil pools of considerable value from a single connecting oil well or wells so as to greatly increase the value of certain leases. The above applies to minerals, too, except that they are connected with mines only. The connecting of leases, oil pools and minerals will be discussed in detail later.

An important object of the invention is to provide a section of a board to represent the surface of the ground or earth which is divided into leases or areas upon which surface representations of a petroleum or a mining operation can be placed at certain times during the play of the game.

A further important object of the invention is to provide another section or sections of the board to represent ground beneath the surface and with said section or sections of the board sub-divided in such a manner that depth or angular distance from certain applicable leases can be readily determined.

A further object of the invention is to provide a game that combines not only luck but also the element of skill as the players are confronted with numerous optional decisions throughout the course of play.

A further object of the invention is to provide, as far as possible, rules of play that do not violate some of the basic principles that occur in actual geological exploration or the development and recovery of mineral wealth from the earth. Many of these similarities to actual geological field conditions or problems are brought out in the Preferred Rules Of Play.

Other objects of the invention will become apparent as I disclose a single embodiment thereof in the following detailed description, taken in conjunction with the accompanying drawings, wherein—

Figure 1:
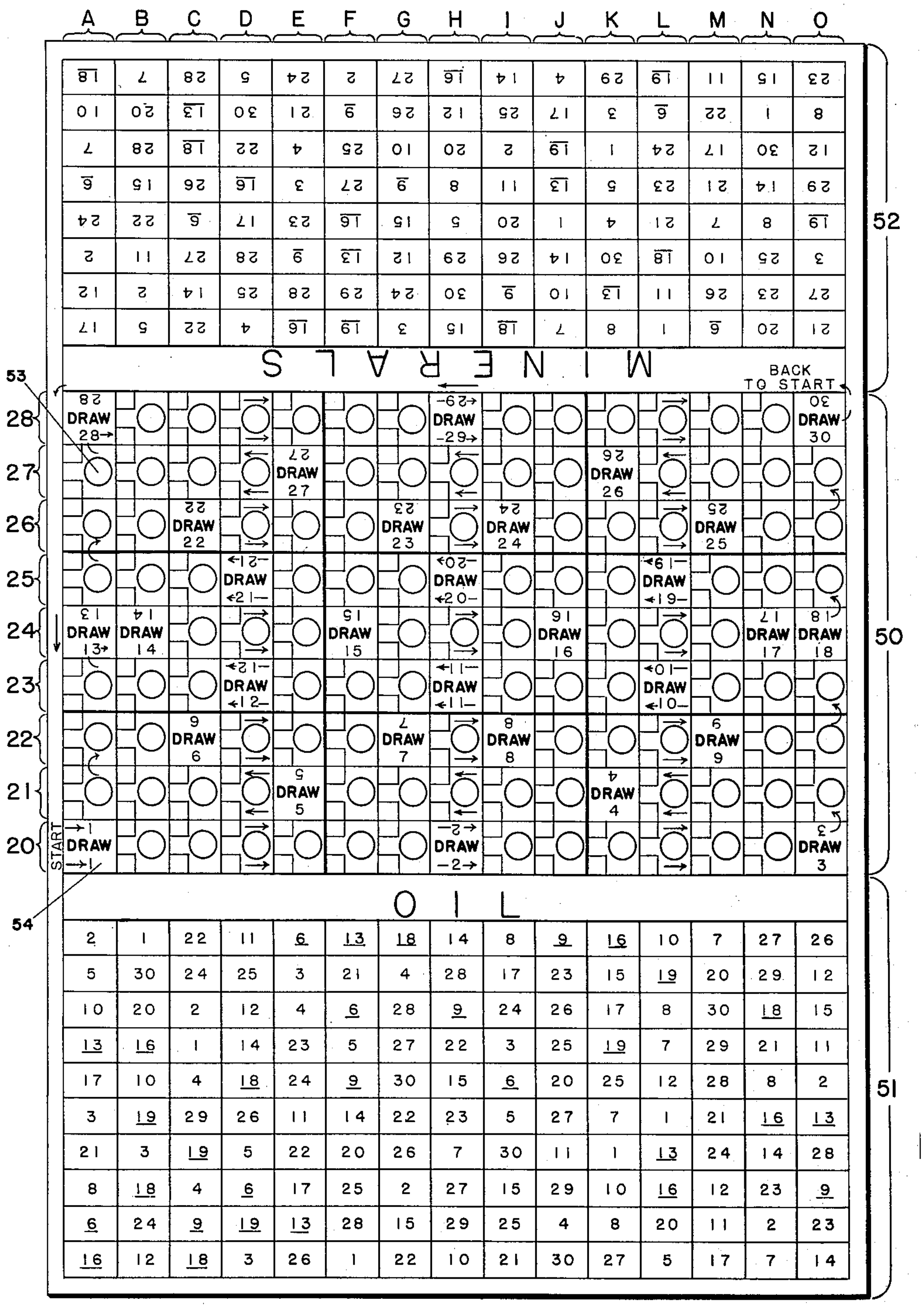
Fig. 1 is a plan view of one form or arrangement of playing board consisting of three major sections: Lease Section, Oil Section and Mineral Section.

Before describing the Preferred Rules of the game a description of some of the important features of the preferred version of the game, which may be constructed of any suitable materials, follows. While I am disclosing a single embodiment of the game invention which is based in many instances on the science of geology it is anticipated and understood that in its broader aspect my invention is not limited to the field of geology as other srtuctures than Mines or Oil Wells may be reproduced or simulated upon the game board that are or may be connected or assumed to be connected or belong with other resources or materials than Oil or Minerals. Fig. 1 shows a version of the game board as a whole with no other playing equipment shown thereon. The upper surface of said board consists of three major divisions or areas whereon at 50 is indicated the Lease Section or ground surface. It can be noted that certain areas or parts of the Lease Section are considered as below the surface according to the placement of the Oil Well or Mine Representations as will be brought out later. The section 51 is the Oil Section of the board where so-called Oil Pool Representations are placed at various times during the play to indicate oil exists in the ground at the point of placement; and section 52 is the Mineral Section of the board where Mineral Representations are placed as above to show the existence of a particular mineral in the ground at the particular point of placement. There are in the disclosed embodiment of the invention one hundred and thirty-five spaces or areas on the Lease Section of which one hundred and five contain a circle, one of which is indicated at 53, and are so-called Lease Locations or Areas and the remaining thirty spaces or areas, one of which is indicated at 54, are so-called Non-Lease or "Draw" spaces or areas which are reserved in this disclosure for the drawing of the so-called Bank or Multiple-Choice Cards. At the start of the game each player is given a like sum of taken or scrip money, say 6,000 units or dollars, and will move his Token or Jump Piece along the path or course delineated on the Lease Section of the board only as many spaces or moves as is indicated by the throw of the dice or any other chance-determining element. At various times a player may move upon a Lease Area that he can purchase from the so-called Bank or Banker, who is preferably one of the players, and if he does so he can indicate purchase, ownership or use of by paying the Bank the necessary fee and placing his own distinctive color or design of Lease Ownership or Title Marker within the circle bounded by said Lease. At various other times he may land upon a "Draw" area and he, according to the Preferred Rules of the game, must draw the top card from the stack of face-downward Bank or Multiple-Choice Cards and act upon the information thereon or, in the case of a Multiple-Choice Card, he must act upon at least one and only one choice thereon and upon doing so his capital will be either increased or decreased or he will be able, if the rules permit, to place after purchase from the Bank an Oil Well or a Mine Structure on a Lease he already controls or has title to and at the same time, according to the Preferred Rules of the game, connect the Oil Well or Mine Structure as the case may be with the appropriate Oil Pool or Mineral Representation on the designated section of the Oil or Mineral Section of the board by further purchasing the necessary so-called Oil Pipe from the Oil Well to the Oil Pool or the necessary so-called Mine Tunneling from the Mine Adit to the Mineral as the case may be. The object of the game is to acquire Leases and develop them by surface expressions of the existence of an Oil Well or Mine operation on the Lease or Leases and to connect them by means of the necessary length of Oil Pipe for Oil and Mine Tunneling for Minerals to as many sub-surface Oil Pools or Minerals as the case may be and the rules of play will allow so as to increase the value of certain Leases, even those Leases that do not actually contain the surface structure or structures but are considered connected to the structure or structures according to the Preferred Rules Of Play, so as to be able to collect a fee from any player unlucky enough to move upon them and this fee is according to the value of the Oil Pool or Pools or Mineral or Minerals or both that are considered as being developed at or connected to said Lease or Leases. The player who by a combination of luck and skill of choice connects his Leases most advantageously and develops them to their fullest by means of Oil Wells and Mines connected to Oil Pools and Minerals will stand the best chance of accumulating the assets of the other players and the last player who remains in the game with assets or cash is the winner.

Figures 2, 3, 4, 5, 6, 7, 8, 9:
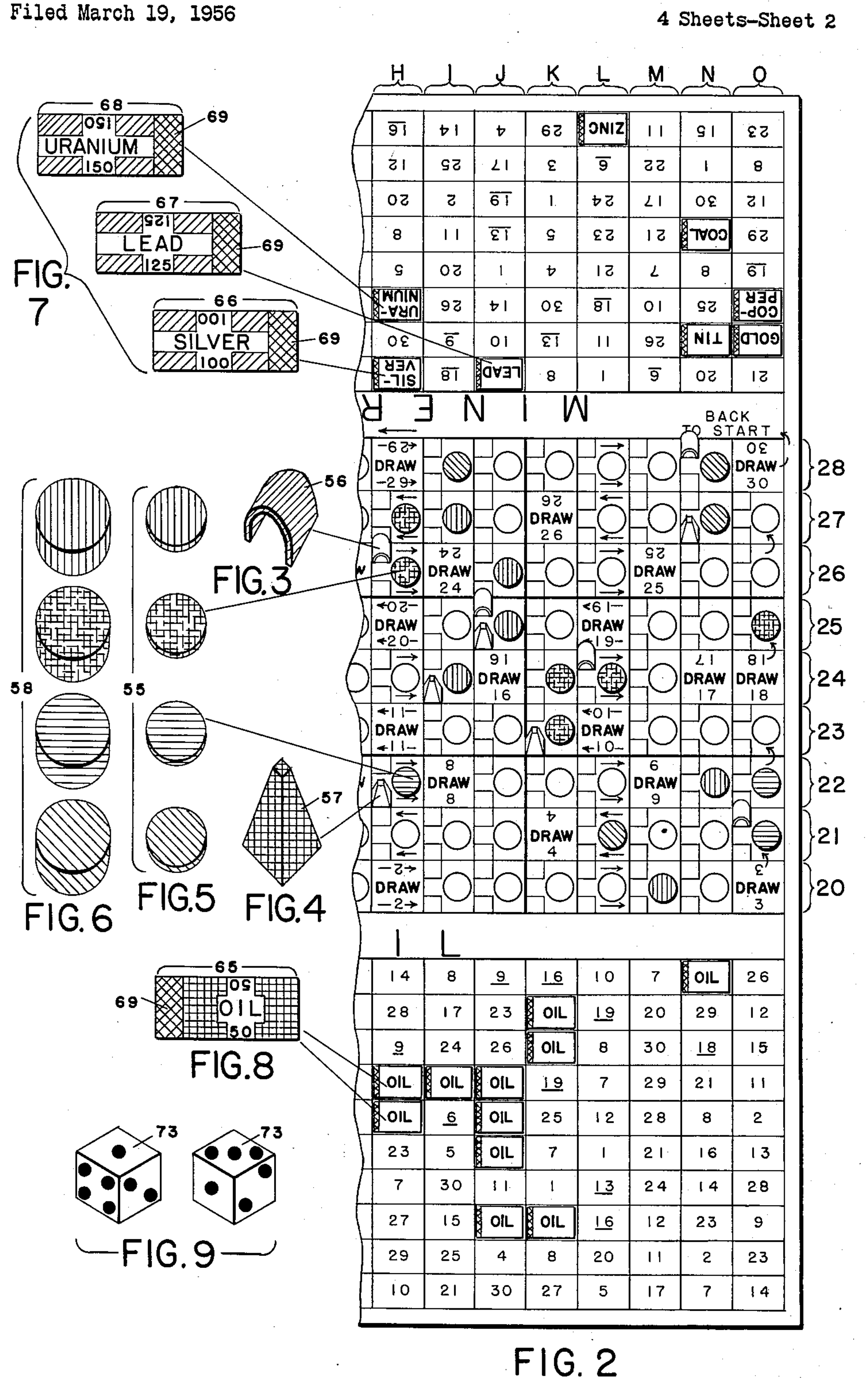
Fig. 2 is a plan view of the right side of the above with some of the playing pieces placed thereon in a representative fashion for frequent reference thereto for clarification of the Preferred Rules Of Play. It can be noted that no Jump Pieces or Tokens are shown on this plan view to avoid confusion with, in particular, the Lease Ownership or Title Markers.
Fig. 3 represents in perspective one of the surface representations of a Mine Entrance or Adit. They are preferably of a tunnel shape as shown.
Fig. 4 represents in perspective one of the surface representations of an Oil Well. They are preferably of a pyramid shape as shown.
Fig. 5 is a perspective view of certain of the Lease Ownership or Title Markers which are indicated as being of distinctive colors.
Fig. 6 is a perspective view of certain of the Tokens or Jump Pieces which are preferably of distinctive colors as above and are not shown on Fig. 2.
Fig. 7 is a plan view of one form of representation of various minerals that are placed at certain locations to represent the mineral in the ground. Only a few of the many minerals possible are illustrated.
Fig. 8 is a plan view of one form of representation of the existence of oil or of an oil pool that is placed at certain locations to represent the oil in the ground.
Fig. 9 is a perspective view of the dice that are used to determine the amount or length of movement of the Tokens or Jump Pieces along the Lease Section of the board.

Because it is frequently necessary in this disclosed embodiment of the invention to refer to a specific Lease or Leases or other areas of the game board and in numerous instances equipment placed representatively thereon as in Fig. 2 a method used for Figs. 1 and 2 is hereby disclosed. Reference to Fig. 1 reveals that the three sections of the board; Lease, Oil and Mineral are divided by horizontal and vertical lines which form squares or rectangles. The Lease Section contains nine rows or horizontal columns which are separately numbered consecutively 20, 21, 22, 23, 24, 25, 26, 27 and 28. The Lease Section also contains fifteen files or vertical columns which are separately lettered consecutively A, B, C, D, E, F, G, H, I, J, K, L, M, N and O with the vertical columns extending both downward and upward through the Oil and Mineral Sections respectively. Any of the above letter-numeral or vice versa combinations will successfully locate a specific area or Lease on the Lease Section of the board for example: E–24, K–21, etc., or one of the fifteen letters such as A, B, C, etc. will locate a vertical file or row extending through all three sections of this one representative example of the novel invention.

The board in its entirety is shown in Fig. 1 and reference has already been made to the preferred three major divisions or the Lease Section at 50, the Oil Section at 51 and the Mineral Section at 52. Each Lease on the Lease Section, one of which is at 53, preferably contains a circle for the location of the placement of a Lease Ownership Marker 55 when it is purchased or leased and preferably two small squares or areas at or near its left boundary line for the location of the placement of a Mine Structure 56 or an Oil Well Structure 57 whenever the occasion arises. It is understood that the Oil Well or Mine Structure may be located anywhere on a Lease that is suitable for the rules of the game. Reference to Fig. 2 of the right side of the board with the addition of some of the equipment shown thereon in a representative fashion for frequent reference thereto shows that Oil Well Structures are preferably placed only on the lower left hand square and Mine Structures only on the upper left hand square of any particular Lease as at J–25 because a Preferred Rule 7(*d*) would be otherwise violated as will be further detailed later. It will be further noted on Fig. 1 there are "Draw" spaces or locations, one of which is indicated at 54, which have numerals both below and above the word "Draw." These numerals are shown as similar on any particular one of the above but they can easily be not similar or of different forms so long as they serve the same general purpose as mentioned below and as long as they can be correlated with the section of the board they refer to. There are like numerals on both the Oil Section and Mineral Section of the board there being five of each number on the Oil Section and four of each number on the Mineral Section and it is understood that their arrangement, form or amount can be varied as long as they can be correlated with the Lease Section of the board. The numerals below the word "Draw" refer to locations or like numerals on the Oil Section of the board at 51 of Fig. 1 for the placement of Oil Pool Representations or Simulations and the numerals above the word "Draw" to locations or like numerals on the Mineral Section at 52 for the placement of Mineral Representations or Simulations or, in other words, on any particular "Draw" location of the two numerals thereon, the numeral nearest the Oil Section refers to locations or numerals on it and the other numeral nearest the Mineral Section refers to locations or numerals on it. It will be understood that although the drawings show a definite pattern or symmetrical arrangement between the Lease and Non-Lease or "Draw" spaces that countless other symmetrical or non-symmetrical arrangements can be made as the particular arrangement of the spaces on the board is not important, nor are their shapes or the names by which they are called.

In the preferred form shown in Fig. 1 and the Lease Section at 50 the arrows indicate that from the "Start" position at 54 in the lower left hand corner of the Lease Section the movement of the Token or Jump Pieces of the players is from left to right in the first horizontal row; thence right to left in the second row above the starting row; thence left to right in the third row above the starting row, etc., or in a zig-zag manner. It can be mentioned here that the jumping or movable pieces traverse the so-called Lease Section of the board space by space from start to finish over and over again until a game is completed.

Any reasonable number of players can participate but it has been found that from two to six players is a desirable number. One person should be the Banker or the agent that collects fees for the purchase or lease of Leases, Oil Wells, Mines, Oil Pipe, Mine Tunneling, etc., and the disbursement or collection of hypothetical monetary values in transactions not between the players themselves, etc. He also issues the necessary amount of equipment to each player at the start of the game and can easily participate as a player on full terms with the other players.

At 58 of Fig. 6 are shown four Token, Jump or movable pieces that are issued one to each player at the start of a game. Desirably they are of different colors as shown with one of each color used for each different color of the so-called Title or Lease Ownership Markers at 55 of Fig. 5.

Figure 11:
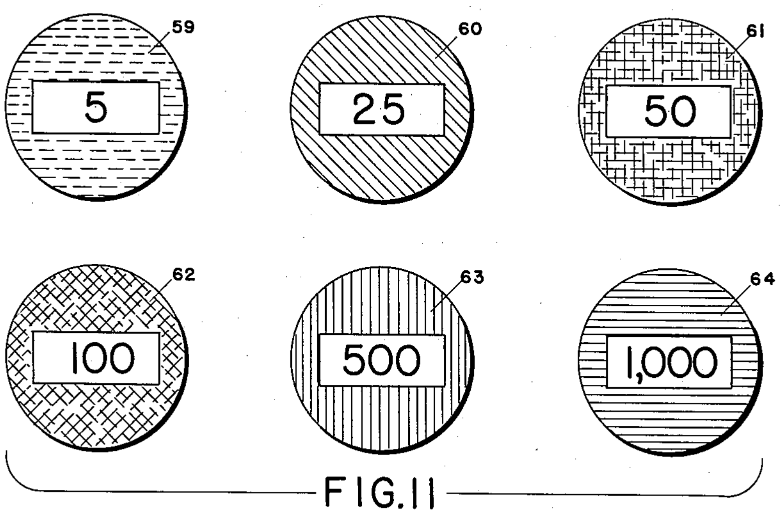
Fig. 11 represents a plan view of one type of play or scrip money in the denominations of 5, 25, 50, 100, 500 and 1,000 units or dollars.

The Banker is in charge of all of the game or scrip money other than the like sums of money that is issued to each player and himself if he plays, say 6,000 units or dollars, at the start of the game. Representative play or token money is illustrated in Fig. 11 at 59, 60, 61, 62, 63 and 64 in various suggested denominations and colors.

The so-called Lease Ownership or Title Markers at 55 of Fig. 5 are also in charge of the Banker or the Disburser. There is a plurality of each color, a separate color of Lease Markers being provided for each player and preferably of the same color as his Jump Piece is colored. Though these markers may be of any suitable material, size or shape they are preferably thin, round and of various colors as shown and it is obvious there could be a distinctive shape or design of the piece for each of the players. A plurality of each color or design of these so-called Lease Ownership or Title Markers, say 20, are provided for each player. The Preferred Rules are to provide a sufficient number for each player to be able to, if he can, purchase or lease the Leases quite indiscriminately but naturally the number provided for each player can be such that he has to use good judgment as he knows when he uses his allotted color or design, say 20, he can purchase no more unless the rules provide he can resell Leases to another player or possibly to the Bank preferably at a loss and he is then able to use the Marker elsewhere if the occasion arises. Due to the fact that different colors or designs of Lease Markers are placed on all leases controlled a player knows readily who owns or controls which property or lease or which lease or area is free for purchase by observing the Lease Section of the board without referring to property ownership or title cards as in certain other games.

The Banker also sells the Mines at 56 of Fig. 3 and the Oil Wells at 57 of Fig. 4 on behalf of the Bank when the need comes about. The Oil Well is, as shown, preferably of a black color, the color of oil, and the Mines preferably brown, the usual approximate color of dirt or ground, but any other colors may be used. It is to be noted that the Mineral Representations at 66, 67 and 68 of Fig. 7 are preferably of a brown color and the Oil Pool Representations, one of which is illustrated at 65 of Fig. 8, are preferably of a black color for easy correlation with the type of structure they belong to. According to a Preferred Rule 7(*c*), mentioned later, there can be a maximum of one Oil Well and one Mine Structure in any single vertical file at any one time and since the disclosed embodiment at Fig. 1 shows fifteen vertical files at A, B, . . . O then the version disclosed needs a maximum of fifteen Oil Wells and fifteen Mines.

On behalf of the Bank the Banker also handles the issuing of the so-called Oil Pool Representations, one of which is indicated at 65 of Fig. 8, and the various so-called Mineral Representations, some of which are indicated at 66, 67 and 68 of Fig. 7. These representations are shown opposite the section of the board of the disclosed form of the game they are placed on when used. Suggested values and the values shown thereon are only illustrative as they can be of any pre-determined amount. These values are not payable values to the bank as in the case of the original purchase or lease of Oil Wells, Mines, Leases, etc., from the bank. Their value is only operative when an opposing player lands on a Lease which pertains to them and the owner collects their value from the unlucky player. The Oil Pool Representations are preferably about twenty to thirty in number and a suggested value of 50 units or dollars is inferred. The Mineral Representations are preferably about fifteen to twenty in number; they each preferably contain different mineral names; and they are preferably of different values roughly according to their value as economic minerals to society. The Mineral Cards illustrated at 66, 67 and 68 of Fig. 7 show for purposes of illustration only three different groups of minerals worth respectively 100, 125 and 150 units or dollars each. Though the drawings of Fig. 7 and Fig. 2 Mineral Section show just a few mineral names, naturally, more are preferred in the game as indicated above. The Oil or Mineral Representations, especially if on cards, may contain certain educational information such as chemical symbol, uses, etc. Criss-crossed lines at 69 at one edge of the Oil or Mineral Card indicates "broken" ground or in other words that a drill or tunnel has gone through the ground. This is not required, naturally, but one can see by referring to Fig. 2 that this broken ground effect lines up vertically with the Oil Well or Mine structure as the case may be and helps to trace downward from the structure or structures involved to the Oil or Mineral Representations presumed attached to said structure or structures. This feature of vertical linearity or columnar extension between the Oil or Mine Structure or Structures and its considered component parts and attached mineral wealth will be discussed in Preferred Rule 7. If all of the Oil or Mineral Representations provided for the game are in use on the game board then it follows that no more can be added on same though the existing minerals or oil in the ground can be exploited if possible through Preferred Rule 8 of counting certain Leases as adjoining and joined in turn to the mineral wealth or any rule change or addition that will allow them to be exploited further.

Figure 10:
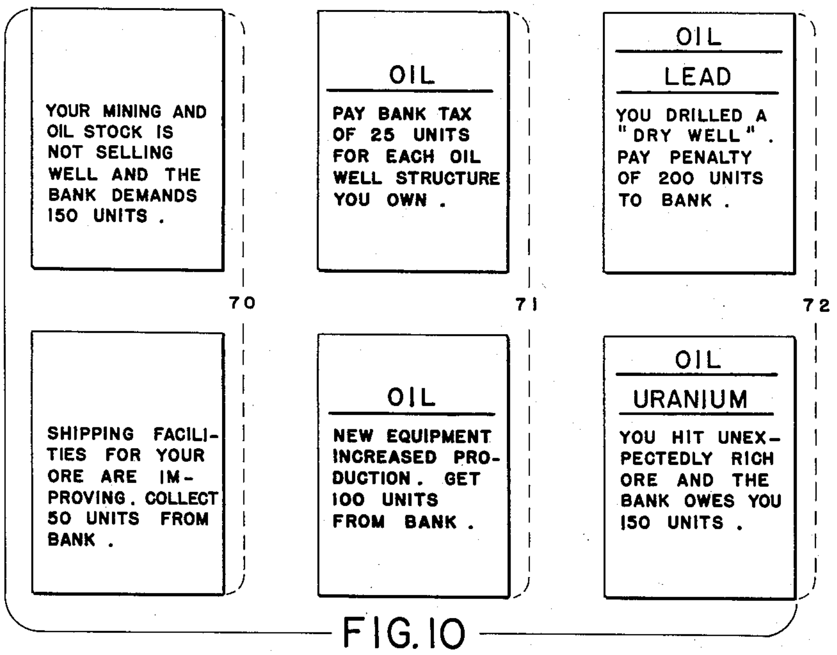
Fig. 10 represents a plan view of several preferred types of so-called Bank or, in some instances, Multiple-Choice cards which are drawn from when a player's jump or movable piece moves upon a "Draw" area of the Lease Section of the board.

The so-called Bank or Multiple-Choice Cards indicated in Fig. 10 at 70, 71 and 72 are preferably of three general types: (1) Type One at 70 requires the player drawing it to collect or pay the Bank money; (2) Type Two at 71 contains the above plus the word "Oil"; (3) Type Three at 72 contains the above plus the name of a mineral such as "Uranium." It will be noted that Type One Bank Card does not actually have a choice but the term Multiple-Choice used in this disclosure is intended to be all inclusive. These cards are just one of many means possible of augmenting or decreasing the player's capital or one of many means of determining who can or may be able to place an Oil or a certain Mineral Representation token on the part of the board designated for it which in this disclosure is the Oil or Mineral Section of the board. These cards are desirably sixty in number with thirty cards of Type One; fifteen of Type Two; and fifteen of Type Three with the exception that the latter fifteen cards will provide for only fifteen of the Mineral Representations of which several different mineral names are indicated at 72. If more or less than fifteen different Mineral Representations are provided for in the game then Type Three Cards must be governed accordingly either by "doubling up" on the mineral names or providing the correct number of cards. The above cards have particular reference to the "Draw" areas or locations of the Lease Section of the board as preferably they are only drawn from when a player's Jump Piece lands on a "Draw" area and the word "Draw" is not intended to be limiting as any other terminology or description that may or may not allow a player by any process with or without the use of the so-called Bank Cards to place or take a chance of placing either an Oil or a Mineral Representation or both or its equivalent on the section or sections of the board provided for it or them is anticipated and reserved for the exclusive use of this novel game. The Bank payable or collection fees, the cost of equipment and the transactions between players are frequently referred to as in so many units of cost because it seems preferable not to mention dollars and cents values but to strive for relative values, in other words, by keeping the money values low with a unit cost scheme for the play money representations you can feel that an oil well, etc., could be, as it undoubtedly is, expensive. This "Unit Cost" scheme is purely arbitrary and any benefits or penalties in the game can be stated in any suitable terminology of any suitable amount as decided upon.

Dice are indicated at 73 of Fig. 9 as a means of determining the amount of movement of the Tokens or Jump Pieces but any other means may be used such as a pivoted pointer that may be spun in circular fashion on a suitably marked or divided dial arrangement or component.

Figure 12:
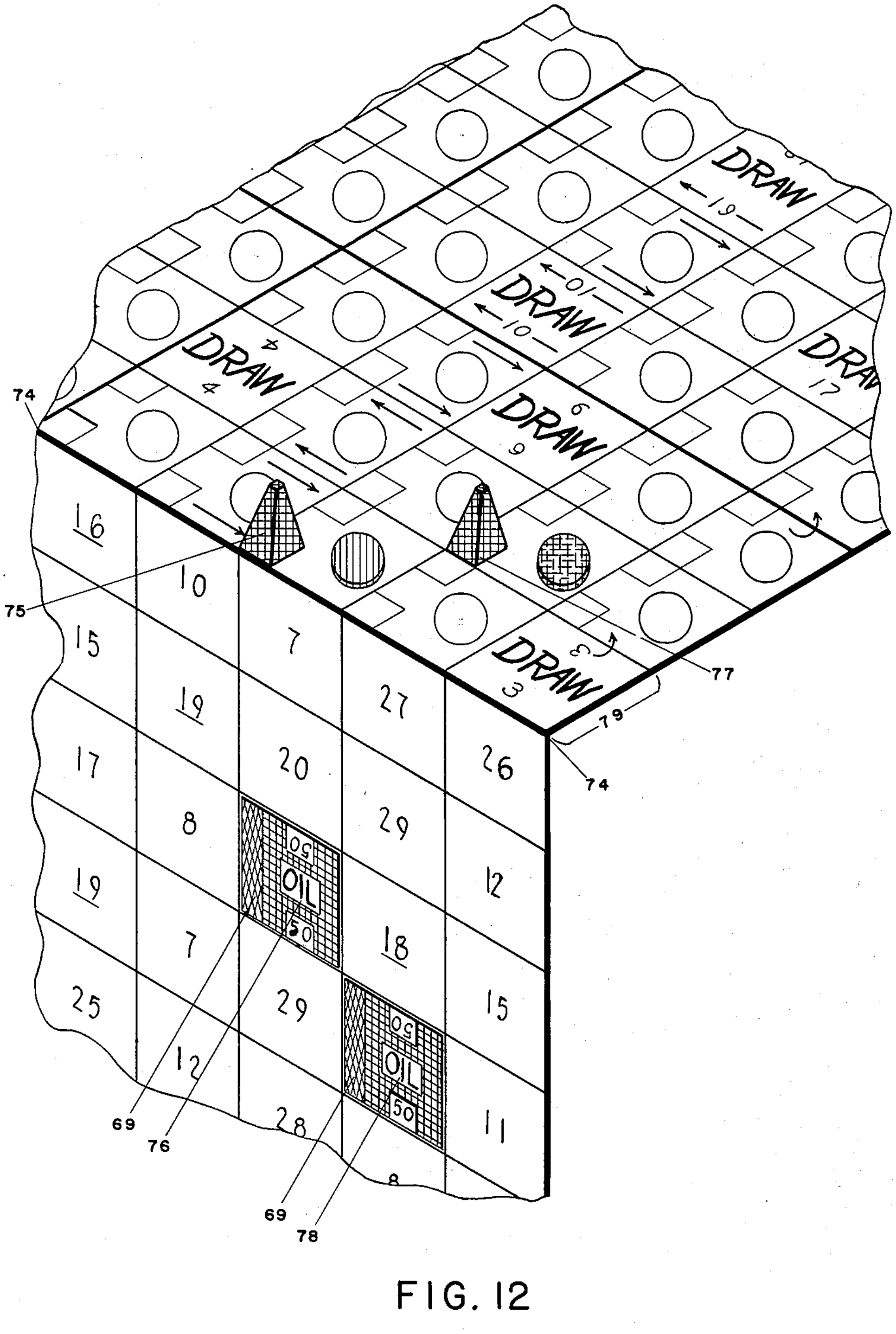
Fig. 12 is a perspective view of a portion of the right side of the playing board with the Oil Section bent from its natural playing or horizontal position to a vertical or depth position to show that there is assumed to be a third dimensional aspect of depth besides the length and width of the Lease Section of the board.

Fig. 12 indicates by a perspective view a portion of the right side of the playing board with the Oil Section bent downward at 74 at its junction with the Lease Section from its natural playing or horizontal position to a vertical or a depth position to illustrate that the novel invention has a third dimension of relative distance which is assumed to be in a vertical or an angular direction from a certain part of the board even though the entire board itself is in its flat playing position of Figs. 1 and 2 with only two playing dimensions of length and width. At 75 is indicated an Oil Well at the surface of a single Lease Location, a red Lease Ownership Marker and an Oil Pool at 76 located three spaces below wherein each of the three spaces is regarded as so many units of feet below the surface of said Lease. Likewise at 77 is indicated an Oil Well, a yellow Lease Marker and an Oil Pool at 78 located five spaces or units below and it is herein noted that four of these depth units below the surface are on the Oil Section of the board and one of the depth units as indicated at 79 is actually on the Lease Section of the board. Thus it is seen that not only is the Lease or Oil Section of the board or a combination of the two or its equivalent considered as beneath the surface of the earth but frequently according to the position of certain surface expressions, which in this preferred version of the game are either Oil Well or Mine Structures, parts of the so-called Lease Section of the board are considered as below the surface. The crossed lines at 69 indicate the depth to which exploration or the extraction process has gone and, according to the Preferred Rules of play, it is understood that the Oil Pipe exists between the Oil Well Structure and the Oil Pool itself or, in the instance of a Mine, the tunneling between the Mine and the Mineral itself. Whether the so-called Mine Tunneling or so-called Oil Well Pipe is laid or not is immaterial as it is assumed to exist, is paid for, and is not necessary to indicate depth to which drilling or tunneling has gone because the last Oil or Mineral Representation as the case may be in a vertical file indicates the last section of Pipe or Tunneling and the Structure itself indicates the beginning of the Pipe or Tunneling. Of course it is realized that individual sections of Pipe or Tunneling could be laid or indicated from the Lease containing the Structure to an Oil Pool or Mineral Representation. Geologically it can be considered more expensive to drill from the Oil Well at 77 to its Oil Pool than from the Well at 75 to its Oil Pool because of the greater depth of exploration work necessary and this novel game takes this into consideration as more so-called Oil Pipe is purchased. The term Oil Pipe and Mine Tunneling is only a general term as these terms include the cost of not only the Pipe and Tunneling but labor costs, material costs of all kinds, etc.

The Preferred Rules Of Play will now be listed together with an explanation as to the reason for the rule which is frequently based on similarities to actual conditions or problems encountered in real-life experiences of extracting mineral wealth from the earth. For clarification frequent reference will be made to Fig. 2 and some of the equipment shown representatively thereon. It is understood that in listing these Rules that changes, omissions or additions can be made without changing the spirit of the original invention.

PREFERRED RULES OF PLAY (1) Give each player a Jump Piece and his allotment of Token Money, such as 6,000 units in suitable denominations. To speed up the game and since the Lease Ownership or Title Markers represent a cash outlay by the players to the Bank when acquiring the exclusive use of Leases, decrease the amount of cash issued each player at the beginning of the game and issue him the equivalent value in his agreed upon color of Lease Marker as there is a constant transaction between the Bank and the players as they acquire Leases at the beginning of the game. Of course it is understood that the Lease Markers are returnable to the Bank for cash if the need arises.

(2) The Bank, preferably in charge of one of the players, is established with the remaining equipment being sure to shuffle and place the stack of Bank Cards face downwards.

(3) Suggested Values:

Each Lease—50 units to purchase from the Bank.

Each Oil Well Structure—100 units to purchase from the Bank.

Each Mine Entrance Structure—100 units to purchase from the Bank.

Oil Well Pipe—10 units a section to purchase from the Bank.

Mine Tunneling—10 units a section to purchase from the Bank.

Preferably the Oil and Mineral Cards are free when a player can use them and their collecting values are operative when an opposing player lands on a Lease pertaining to them.

(4) Each player throws the dice once and the one who obtains the highest number by adding the total of the two dice starts the game with the turn of play moving from then on from left to right. According to the thrown total of the dice each player moves his Jump Piece that number of spaces from the "Start" square in the lower left hand corner of the Lease Section of the board and in the direction of the arrows at all times. When the last square is reached the previous route is retraced, etc. . . . A double six, five, etc., allows another throw of the dice before relinquishing.

(5) Each time a player's piece lands on a Lease Square (marked with a circle in the center) not already bought he may acquire it by paying the Bank 50 units and putting his colored Lease Marker Disc within the circle of the Lease Square.

(6) Each time a player's piece lands on a "Draw" square he must draw from the top of the Bank Card Stack and after following the information thereon place it face upwards underneath the stack. After all these cards have been used once, reshuffle and place all cards face downwards again.

In no case is more than one choice allowed from any one Bank Card but one choice must be acted on. As the Oil and Mineral Cards are played on their respective Oil and Mineral Sections of the board all of the Bank Cards are gradually being converted to a type that has one choice only with the "Oil" and "Mineral" choices gradually becoming void. This makes all Bank Cards operative at any stage of the game.

(7) The "Oil" on a Bank Card means it is possible that you can place one Oil Pool Card at any of the designations below the word "Draw" where your Jump Piece now rests. The mineral name such as "Iron" on a Bank Card can apply only if the iron card is not already in use and it can be p'aced on any of the designations above the word "Draw" where your Jump Piece now rests. The designations mentioned below and above the word "Draw" refer to locations on the Oil and Mineral Sections of the board only. To place either type of card you cannot violate any of the following conditions:

(a) You must already own a Lease in the vertical file where you wish to place the card.

(b) Naturally the space must not be occupied by a previous card.

(c) Only one Oil Well Structure and one Mine Entrance Structure is allowed within any one vertical file. Fig. 2 shows that Vertical Files H, J and N are fully developed as far as Oil Well and Mine Structures are concerned. Vertical Files L, M and O are still open for an Oil Well. Vertical Files I, K, and M are still open for a Mine Structure. Vertical Files I and K are still open for a Mine Structure only as they each contain one Oil Well. Vertical File M is still open for both types of structures.

(d) With both types of Structures in the same file, the Oil Well is always nearest the Oil Section and the Mine Entrance nearest the Mineral Section of the board. In other words, the first Structure in a vertical file of the Lease Section of the board can be placed anywhere on any Lease of that vertical file but the second Structure (which has to be an unlike Structure compared to the first placed Structure) which closes the vertical file (see c above) for further Structures must be nearer to its section of the board, Oil or Mineral as the case may be, than the first placed Structure. The above is done to keep from laying Drill Pipe through ground bought for Mine Tunneling or Mine Tunneling through ground bought for Drill Pipe. Reference to Vertical Files H, J and N of Fig. 2 shows that the two unlike Structures in each of these files have been placed accordingly.

(e) You always add additional Oil or Mineral Cards in the same vertical file by building downwards. In other words you can increase production by drilling or tunneling deeper for more mineral wealth from a previously existing Oil Well or Mine . . ., also, if you have proved that the ground contains no mineral wealth by going through it how can you say it contains mineral wealth later? Fig. 2 shows that Yellow's Mine at L–24 tapping Zinc is closed for additional minerals in File L; Green's Mine at N–28 has three spaces at 30, 1 and 15 open for further mineral development in that file; Red's Oil Well at J–25 has two spaces at 4 and 30 still open; etc. It is interesting to note that Blue's Mine being place at O–21 has reserved Vertical File O for his exclusive use for possible future mining development according to Preferred Rule 7(c) above.

(f) That if the above condtions are met that you will immediately purchase from the Bank an Oil Well or Mine Structure (if you do not already own the Structure) and the Pipe or Tunneling to connect the Structure with the mineral wealth at 10 units for each section and you buy a section for each space below the Structure to the card itself. This Pipe or Tunneling is not placed on the board but is paid for and assumed to exist and can be imaginary as the Structure is the beginning of the Pipe or Tunneling and the last Oil or Mineral Card in the same vertical file is the last section of this Pipe or Tunneling. It is to be noted that if the player is just "adding on" another card as in (e) above, the only fee he pays the Bank is 10 units for each section below the last card in the vertical file to the present card. Red's Oil Well in File J of Fig. 2 has three Oil Pool Cards "added on" to the original card for a total of four and to the first Oil Card down from the Well at J–25 he bought nine sections of Oil Pipe and subsequently bought four additional sections down to his last card directly above still open space at 4, etc.

(g) For the Oil or Mineral Card or Cards there must be a connecting Oil or Mineral Structure in the same vertical file. Or vice versa a player cannot erect an Oil Well or Mine Entrance Structure in a vertical file without connecting with at least one Oil Pool or Mineral Card in the same file. Reference to Fig. 2 shows that wherever there is an Oil Well Structure on a Lease Section of the board you can trace downward in the same vertical file and find at least one Oil Pool Card and the same is true for any Mine Structure by tracing upwards.

(h) The Oil Rights and Mineral Rights in the same vertical file can be owned separately by two opposing players or by one player. Vertical File H of Fig. 2 shows that Yellow has the Mineral Rights and Blue the Oil Rights; Files J and N show that Red and Green respectively have both the Oil and Mineral Rights in each of the aforementioned files.

(8) Leases owned by one player are counted as a complete unit for collecting purposes from opponents even though they cross vertical files if:

(a) Touching side to side and not corner to corner.

(b) One of the connecting Leases contains Oil Well or Wells or Mine or Mines or both.

In Fig. 2 Red's Oil Well and Mine at J–25 controls two Leases at J–25 and J–26 with the same collecting value and if he can add later the available Lease at I–25 he will then have four connecting Leases at J–25, J–26, I–25 and I–24 each with the collecting value of all cards considered connected to the two Oil Wells at I–24 and J–25 and the Mine at J–25 according to Preferred Rules 9 and 10 belows, etc.

(9) Oil and Mineral Cards in the same vertical file do not have to touch side to side to be counted as a complete unit for collection purposes. Yellow's Oil Well at K–23 controls three Leases and three, not two, Oil Pool Cards in Vertical File K plus the other Oil Pool Card considered connected acording to Preferred Rule 10 below.

(10) An opposing player controlling a vertical file to either side of your vertical file can by butting a card next to a side of any of your cards have the advantage of any of your cards that can be connected side to side as in Leases of 8(a) above. By the same token if a player controls two or more consecutive vertical files he can extend his Oil Pools or Minerals laterally between vertical files. It follows that the opposing player also gets the advantage of at least one additional card in the process if you attach to any of his cards. Many Oil Pools or Mining Localities in actual practice are exploited by two or more organizations or companies. In theory the more Leases you can acquire within the mining area the more money you can make. Red's Oil Well at J–25 and two Leases at J–25 and J–26 controls the four Oil Pool Cards in the same Vertical File J according to Preferred Rule 9 and also according to Preferred Rule 10 one Oil Pool Card in File K, one in File I and two in File H. Therefore, Red's two Leases at J–25 and J–26 control the value of the eight Oil Pool Cards above plus the Mineral Card value of Lead in File J as it is assumed as connected to Red's Mine at J–25. Blue's Oil Well at H–22 controls two Oil Pool Cards in Vertical File H, one in File I and three in File J for a total of six cards. Red's Oil Well at I–24 controls six Oil Pool Cards. Thus Lease or Leases either single or those considered as connected can collect for the value of Oil and Mineral Cards at the same time if possible. Other examples not mentioned above are illustrated on Fig. 2.

(11) An opposing player cannot "build" onto your Leases for collection purposes but he can on the Oil Pool or Mineral Cards as mentioned in Rule 10 above.

(12) Any player whose Jump Piece lands on an opponent's Lease or block of Leases (connecting Leases) containing an Oil or Mine Structure or Structures or both must pay the opponent the value of all cards connected to the Structure or Structures.

(13) When a player runs out of cash he is out of the game, his equipment is left on the board and is counted as "dead" Leases and "abandoned" Oil Wells and Mines with no collecting value whatsoever.

(14) It is the responsibility of each player owning Leases with collectible values to see that he is paid when an opposing player lands on them before the next player moves his Jump Piece or else forfeit the benefit due him.

The above Preferred Rules Of Play have in many instances been compiled for this novel game so as to be similar to and not conflict with certain facts of actual geological practice and geological phenomena but the complexities of geology and one's own personal opinion or preference are such that numerous alternatives or changes could be made in the above Preferred Rules Of Play, the game board or its equipment without parting materially from the inventor's original conception and a few of many of these different interpretations, additions or changes will be indicated to prove this fact.

All of the suggested values, whether payable or collectable, of Preferred Rule 3 are purely arbitrary and may be construed to be of any sum or amount whatsoever. Though the above rule states each Lease as costing a certain value it is realized that the purchase price for the use of said Leases may vary on different parts of the Lease Board and the agreed upon value or values of all Leases or Lease Locations may be suitably indicated upon the Lease Board or Section itself whether Lease by Lease or by grouping or bounding certain Leases into the same value areas.

At 80 of Fig. 12 is indicated a so-called Optional Draw-Lease area that is the Lease circles containing the word "Draw" with a numeral both above and below. This method or any variation thereof can be used on various parts of the Lease Board in place of some or all of the straight Lease only areas or locations of Figs. 1 and 2. It is preferred to have about one-quarter of the Leases to be of this type. This innovation is unique and novel in that it provides a means of speeding up the game play in the beginning by allowing more of a chance of placing some Oil and Mineral Representations on the board quickly so that interest is aroused and as the game play progresses these areas of a double choice nature are slowly eliminated to sustain interest in the game and yet decrease the chance of the play dragging out tiringly. When a player lands upon one of these, he can, if it is available, either buy the Lease or draw a Bank or Multiple-Choice Card. If the Lease is bought the Lease Ownership Marker covers up the area and this "Draw" section is eliminated. Of course, Preferred Rule 6 has to be changed to take care of this method by adding that these are Optional Draw-Lease areas and if a player buys the Lease he does not draw a Bank Card.

It is not necessary to indicate lease ownership by the use of the so-called Lease Ownership or Title Markers placed upon the board itself as lease ownership can be determined by the issuing of say Lease Ownership or Title Cards to a player as he acquires a Lease or a Lease Section. However, it is deemed most preferable due to the mechanics of the game to use Lease Markers upon the Leases themselves but any other means is anticipated and reserved for the use of this game. It is to be understood that all reference to this unusual game invention heretofore and following is on the basis of the use of some type of Lease Ownership Marker that can be placed upon the Leases themselves and that they are preferable but not absolutely essential as there are other alternatives for indicating lease ownership.

At 83 of Fig. 2 is indicated that like-numbers or any other designations used on the Oil or Mineral Section of the board may be coded by design or color or both so that it is relatively easy to quickly ascertain the spaces available for the placement of a Oil or Mineral Representation. The above scheme can be carried out on the so-called "Draw" locations for easy correlation between the Lease and appropriate other section of board.

Although Preferred Rule 8 allowing all Leases owned by one player that adjoin side to side to count as one complete unit or block of Leases is not limited as to number or extent of coverage of board it is anticipated that the joining Leases of above could be limited in extent by any means. For example, all Leases of any player can be counted as adjoining only within the nine rectangles formed by the two heavy vertical lines and two heavy horizontal lines of Fig. 1. Under this rule Red's Lease at J–26 of Fig. 2 would not be considered as adjoining his Lease at J–25. However, the "Draw" squares or Non-Lease areas where there are two or more touching corner to corner effectively break up the continuity of the Leases and make it difficult to have anything but small patches of adjoining Leases of the same color or ownership. Any scheme to limit Oil or Mineral Representations or the like that are counted as adjoining or acting as a unit can be carried out on the part or parts of the board provided for them or even on the Oil or Mineral Representations themselves. In geology certain mineral assemblages or Family Groups are usually found together in varying amounts such Lead-Silver-Gold etc., and it is uncommon to find certain minerals with other minerals due to their chemical and perhaps physical behavior. Therefore, the rules could allow only certain minerals to be attached to a certain Mine, the first mineral in the file of a Mine determining other minerals that can exist in that file by coloring for example the Lead-Silver-Gold Representations the same color and other Family Series different colors. The Oil Representations could be done likewise as different grades of crude oil are found in different oil fields throughout the world. All of the above changes or adaptations and those of a similar nature are construed to be within the limits of the invention as disclosed.

The Preferred Rules allow a player to place, if possible, a Structure on a Lease and connect that Structure with mineral wealth regardless of the relationship in space of said Lease with other Leases of any party but this concept could be changed by allowing the acquisition or possible acquisition of mineral wealth only if certain Leases are controlled by the party in question.

Preferred Rule 12 allows all Leases or block of Leases considered as connected with a collecting value owned by one player i.e. containing an Oil Structure or Structures or a Mine Structure or Structures or both and in turn connected to an Oil or Mineral Representation or Representations or both to be of the same value for collecting purposes when applicable from opposing players but countless other schemes of valuation can be devised such as having the Lease or Leases containing a Structure or Structures to be double the value of all connecting Leases of the same color or ownership. It is possible to go as far as allowing a certain value for owned Leases without improvements.

The Preferred Rules allow each Lease connected with subsurface mineral wealth to maintain and possibly augment the mineral wealth but it is realized that rule changes could allow for a cessation either temporary or permanent of the benefits of certain mineral wealth.

The Preferred Rules with references to the Mineral Representations such as Iron, Uranium, etc., allow their possible use only if mentioned by name on the Bank Cards when drawn and it is not already in use. By appropriate rule and game equipment changes the use of mineral wealth of all categories can be on a player opportunity basis or, in other words, the player can use any Mineral or Petroleum Representation available at the time.

Although Preferred Rule 13 has no provision for the selling of assets between players to the Bank for needed cash it is realized that Preferred Rule 13 is arbitrary and provisions can be made whereby a player can convert assets to cash by interchange of any nature between the players concerned or possibly by loan or at a discount from the Bank.

Of course the rules could allow just one Oil Well or Mine in any one vertical file the first taking precedence. Under this set-up a player should count only Oil Representations or Mineral Representations as adjoining although he can have the privilege of butting an Oil Representation next to a Mineral Representation in the same file or an adjoining file.

This unusual and novel game has been shown by the accompanying drawings together with the attached descriptive details and Preferred Rules Of Play and other variations to be intended primarily for the playing of a game based on the science of geology but it is to be understood that in its broader aspect my invention is not limited to the surface representation or indication of possible future or actual existence of Oil or Mine Producing Centers together with the mineral wealth they produce out of or from the earth with the resulting benefits derived therefrom as other types of properties with or without representative equipment or improvements thereon are contemplated, and other privileges or benefits or penalties than those mentioned could be provided for in other variations of my invention. For illustration and not for the purpose of limitation it is possible to use the same general board desgin for putting up or having already inscribed thereon indications of various types of manufacturing centers or industries on what has been called the Lease Section and extending supply lines which can be considered either above or below ground surface (which has its reciprocal in what has been called Oil Pipe and Mine Tunneling) and these supply lines can be considered as going downward, upward, sideward or angularly to connect with or tap resources or products or reserves (which has its reciprocal in what has been called Oil or Mineral Representations) of that industry so as to collect a certain fee or penalty when someone lands or moves into the industry, etc.

From the above disclosure of my invention it can be appreciated that I have provided a new and novel game that follows very closely the conditions of geological field conditions and teaches in many respects the problems involved in geological exploration together with the benefits and hazards that are encountered in recovering mineral wealth from the earth and further that besides luck in playing the game you are confronted with numerous decisions the correct choosing of which may be to your advantage or disadvantage; that the game is versatile for the pattern of valuable leases and their eventual values varies from game to game; that these values can become as much as a player can make them within the scope of the game; that it is possible for a player who is far behind to better himself considerably in the latter stages of the game and win; and that due to the fact that some of the leases can become quite valuable in the latter stages of a game's play it is most likely that the game will terminate before play becomes boresome.

I have described one specific embodiment of my invention together with the preferred rules of play, certain suggested changes and additions, and in doing so certain descriptive terms have been used which are not intended to be limiting as the game invention can take many different shapes or forms without parting from the spirit of the original conception or the scope of the appended claims.

Having thus described my invention, I claim:

1. In a geology game apparatus a board having a section of field of play to represent the surface of the earth, means dividing said section into a plurality of spaces which form a continuous path delineated thereon for continuity of play, certain of said spaces having different designations than other spaces, a set of playing pieces each different from the other to register movement thereon, means for determining the amount of movement of playing pieces thereon, markers of distinctive colors to be used thereon to show player ownership of certain marked spaces, a set of pieces to represent surface developments to be bought and placed on spaces thereon owned by a purchasing player, cards to be drawn that give the possessor one play or options of play that are to his advantage or disadvantage, a second section of said board having spaces indicative of relative vertical distance with regard to said first section, a plurality of resource cards, each resource card designating a natural resource, chance determining means including said certain spaces on said first section and said first mentioned cards indicating a resource card to be placed on certain spaces of said second section by a player, means providing information for determining relative distance from a surface development to the resource card on said second section, the relative distance from the surface development to the resource card costing the owner according to that distance, and means comprising additional designations on said resource cards for determining penalties from an opposing player resting upon said surface spaces.

2. A geology game as defined in claim 1 in which said second section represents oil resources, a third section representing mineral resources, certain of said resource cards designating oil resources and others of said resource cards designating mineral resources, said resource cards being placed on said second and third sections in accordance with the resource indicated.

References Cited in the file of this patent

UNITED STATES PATENTS

| | | |
|---|---|---|
| 2,026,082 | Darrow | Dec. 31, 1935 |
| 2,676,018 | Cornish | Apr. 20, 1954 |
| 2,723,857 | Miller | Nov. 15, 1955 |
| 2,729,451 | Larson | Jan. 3, 1956 |
| 2,746,756 | Sitton | May 22, 1956 |

FOREIGN PATENTS

| | | |
|---|---|---|
| 517,108 | Great Britain | Jan. 19, 1940 |
| 601,062 | Great Britain | Apr. 27, 1948 |